Nov. 21, 1944.  L. R. HILL  2,363,323
HIGH PRESSURE LAMINATED MATERIAL
Filed Dec. 17, 1941
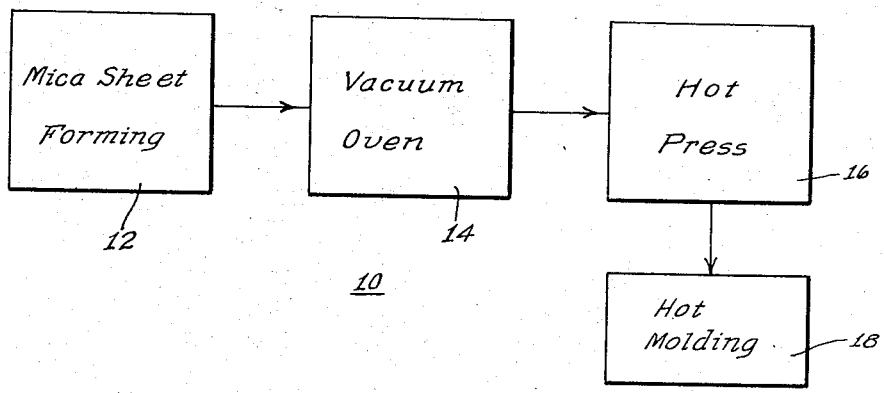
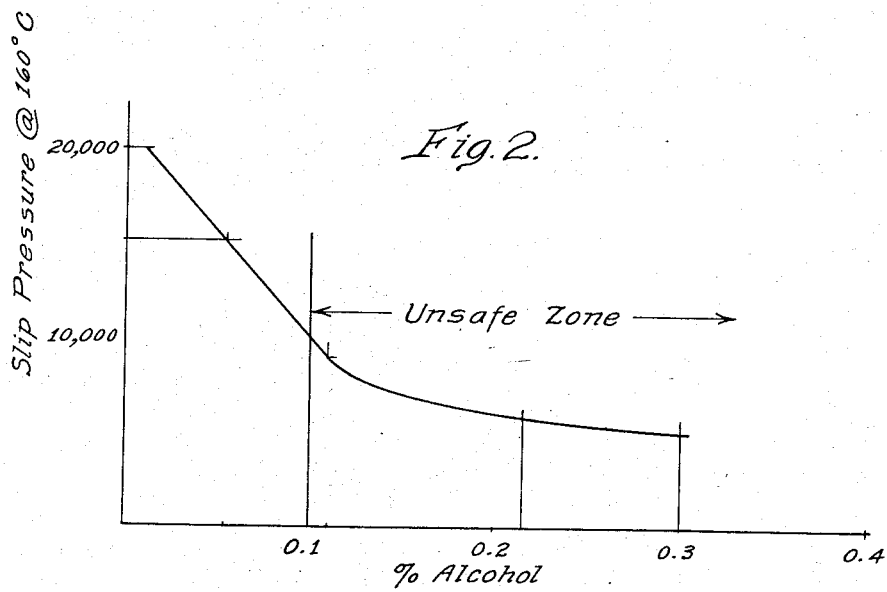
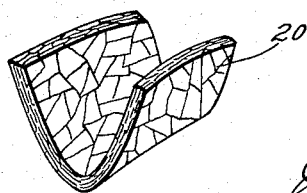
WITNESSES:
INVENTOR
Lawrence R. Hill.
BY
ATTORNEY Patented Nov. 21, 1944

2,363,323

UNITED STATES PATENT OFFICE 2,363,323

HIGH-PRESSURE LAMINATED MATERIAL

Lawrence R. Hill, Wilkinsburg, Pa., assignor to Westinghouse Electric & Manufacturing Company, East Pittsburgh, Pa., a corporation of Pennsylvania Application December 17, 1941, Serial No. 423,372

3 Claims. (Cl. 154—2.6)

This invention relates to laminated materials, and more particularly to electrical insulation prepared from mica flakes and a shellac binder.

In high performance electrical machinery, the insulation employed in the apparatus may be subjected to high pressures. For meeting the requirements of electrical insulation under the highest pressures developed in the machinery, bonded mica plate molded to predetermined shape is generally employed since it performs more satisfactorily under such conditions than any other material.

Recent increases in the amperage and power of electrical machinery have imposed destructive pressures upon the electrical insulation in such application as V-rings for insulating commutators from the dynamo-electric machine shafts. It has been found that shellac bonded mica, for example, begins to fail at the pressures and the temperatures inherent in modern machinery.

At pressures of 6000 lbs. per square inch and higher, at 160° C., ordinary wet bonded mica molded V-ring insulation began to slip and delaminate in operation. Failure of the apparatus followed the slippage.

Additions to the shellac to improve the high pressure properties of the insulation at the operating temperatures resulted in no noticeable improvement. For example, copal, gum elemi, ethyl cellulose, rosin, polyvinyl acetals, and other vinyl type resins were added to shellac. In many cases, these additions functioned as plasticizers for the shellac and the V-ring insulation failed at pressures lower than 6000 lbs. per square inch. In other cases, the material was no better than shellac alone.

The object of the invention is to provide laminated electrical insulation from mica flakes and shellac binder capable of withstanding high pressures at elevated temperatures without slippage or delamination.

Another object of the invention is to remove residual alcohol from shellac bonded mica insulation in order to impart increased resistance to slippage at high pressures and elevated temperatures.

Other objects of the invention will, in part, be obvious, and will, in part, appear hereinafter.

For a fuller understanding of the nature and objects of the invention, reference should be had to the following detailed description taken in conjunction with the accompanying drawing, in which:

Figure 1 is a schematic view of a process for treating shellac bonded mica;

Fig. 2 is a graph plotting percentage of residual alcohol in the shellac against slip pressures at 160° C.; and Fig. 3 is a view in perspective of a fragmentary section of the molded V-ring insulation.

Electrical insulation prepared from mica flakes and a suitable binder has been found to be superior in many respects to other types of electrical insulation, particularly when used at high pressures and elevated temperatures. While numerous types of binders both organic and inorganic, have been employed in bonding mica flakes to produce electrical insulation suitable for specific electrical insulation requirements, shellac binder has, in general, been employed for the major proportion of such insulation.

While shellac bonded mica has produced electrical insulation satisfactory for most purposes, it has been found that for the severe requirements of V-ring insulation in recent high performance electro-dynamic machinery, the material has failed under the stresses imposed. The temperatures adjacent high amperage commutators is extremely high, that is, of the order of 160° C. In order to retain and satisfactorily insulate the commutator segments on the shaft of the machine, high pressures upon the mica insulation are necessary. The pressures required are of the order of 10,000 lbs. per square inch.

In preparing electrical insulation to be formed into predetermined shape wet bonded shellac—mica insulation is employed. The wet bonded mica flakes have been customarily subjected to heat and pressure in order to remove the solvent from the shellac and to bond the mica flakes into a laminated sheet. The sheet is hot molded in a subsequent step of the process into a predetermined shape to meet the service for which the electrical insulation is prepared.

In building electrical machinery, the V-ring insulation is applied to both sides of the commutator with sufficient pressure to assure satisfactory operation under any predicatable conditions. In the case of high performance machines this pressure is so high that the shellac bonded mica frequently slips and extrudes out of the spaces between the commutator and the member applying pressure.

It has been discovered that the slippage and delamination of shellac bonded mica insulation results to a great extent from residual alcohol present in the shellac after the laminated sheet has been prepared. Referring to Fig. 2 of the drawing, a graph plotting percent of residual alcohol in a shellac binder against slip pressure at 160° C. is shown. Mica insulation prepared by the wet bond process contains more than 0.2% residual alcohol in the shellac. By reference to the graph in Fig. 2, the pressure at which slippage will occur for this amount of residual alcohol is approximately 6000 lbs. per square inch. Since the high-speed electrodynamic machinery being manufactured today calls for pressures of the order of 10,000 lbs. per square inch, such insulation will fail readily at 160° C.

The graph of Fig. 2 shows that at approximately 0.1% of residual alcohol, the insulation is capable of withstanding pressures of approximately 10,000 lbs. per square inch at 160° C. before slippage will occur. As the residual alcohol is further reduced in amount, the pressures at which failure occurs are higher. Thus at 0.01% of alcohol in the shellac, approximately 20,000 lbs. per square inch pressure may be applied to the material before slippage or delamination will occur. Therefore, it is unsafe to employ insulation in high performance machines with more than 0.1% residual alcohol.

In order to remove the residual alcohol to an amount sufficient to provide for high compression pressures being withstood, molded shellac-mica insulation formed into both solid sheets and V-rings was subjected to evacuation at elevated temperatures. The insulation did not respond satisfactorily to this treatment. The alcohol content was not materially changed. Blisters and puffed areas in the insulation occurred, and made the insulation useless. It is believed that once the shellac has been polymerized, the residual alcohol is substantially unremovable.

In preparing mica insulation with 0.1% or less of residual alcohol, the schematic process 10 of Fig. 1 has been found to produce the desired product. The conventional mica sheet forming machine 12, well known in the art, is employed for laminating mica flakes with a solution of shellac. Generally, the machine 12 consists of a mechanism for depositing a uniform layer of mica flakes upon a bed which travels under an apertured pan filled with a shellac solution which drips upon the layer of mica flakes passing therebelow. No pressure is applied to the sheet at this stage of the process. The mica flakes and shellac solution are subjected to heat whereby a substantial proportion of the alcohol solvent is removed. Unpressed, loosely bonded sheets of a size of the order of 36 inches by 36 inches are severed from the endless strip formed on the machine 12.

The strips formed on the machine 12 are stacked in a vacuum oven 14 in such a manner that alcohol vapors from the shellac may be liberated and removed readily from the sheets. When the oven 14 has been filled, a closure is applied and the sheets are subjected to a vacuum of approximately 27 inches of mercury at a temperature in the range of 20° C. to 80° C. Under these conditions, the residual alcohol is rapidly removed. The vacuum may range from 20 inches of mercury to better than 29 inches, depending on the evacuating means and the temperature. As the temperature increases the vapor pressure of the residual alcohol is greater and less vacuum is required to remove the alcohol. The temperature to which the shellac is subjected should not exceed 80° C. since the shellac will begin to polymerize and this is undesirable. At the end of a period ranging from four hours at the higher temperature to 20 hours at the lower temperature, the residual alcohol in the shellac is 0.1%, or less.

The individual, vacuum treated, but unpressed sheets of mica plate are from 0.005 inch to 0.020 inch in thickness. The sheets are stacked in a hot press 16 to a thickness sufficient for the insulation. Generally, 6 sheets of vacuum treated mica are molded into a single insulating sheet or plate in the hot press 16. The hot press 16 applies a pressure of from 8 to 150 tons on 36 inch by 36 inch sheets at temperatures of 140° C. to 170° C. From two minutes to four hours in the hot press is necessary to produce the hot pressed sheet of desired thickness.

Since the sheets coming from the hot press 16 are flat, while industrial requirements generally call for shapes other than a flat sheet, the product from the hot press may be further molded to a predetermined shape in a press, such as at 18. For the purpose of the problem of V-ring insulation, as specified herein, the 36 inch by 36 inch sheets are cut to a predetermined shape and put between dies and molded at pressures of from 100 to 2000 lbs. per square inch in a temperature range of from 140 to 170° C.

The product from press 18 is shown in a fragmentary view in Fig. 3. The V-ring 20 of Fig. 3 may be a segment in case of extremely large V-rings or else a complete ring for use in small electro-dynamic machinery.

The final product, such as the V-ring 20, Fig. 3, has been subjected to pressures of the order of 10,000 lbs. per square inch and higher at 160° C., without slippage, skidding or delamination of the insulation. Similar material prepared without vacuum treatment to reduce the alcohol content of the shellac to 0.1% or less, has generally failed when the pressure reached 6000 lbs. per square inch.

The mica flakes which are employed in preparing the insulation are preferably natural mica which has been prepared free from earth and other impurities. Mica for this purpose is well known in the art and need not be further described. In some cases, synthetic mica material which has characteristics rendering it suitable for this purpose, may be formed into the laminated electrical insulation described herein.

In preparing electrical insulation, the shellac is substantially arsenic-free orange shellac in alcohol solution. Where the laminated material is to be employed for other than electrical insulation purposes, requiring high compressive stresses to be withstood, the shellac need not be arsenic-free. Solutions of from 7% to 40% shellac in ethyl alcohol may be employed in the mica sheet forming machine 12. Generally, 25% solutions are most satisfactory for the purpose.

It has been discovered that where the shellac contains more than 0.05% of iron, the laminated material will be subject to slippage and delamination in spite of the removal of residual alcohol to the low percentages herein disclosed. Accordingly, a substantially iron-free shellac, i. e., having less than 0.05% iron, is required to produce the high compression strength material set forth.

The laminated sheet is prepared with from 4% to 15% by weight of shellac binder based on the weight of the mica flakes. Less than 4% of shellac binder results in a poorly bonded sheet. When the shellac exceeds 15%, the shellac binder may fail at pressures above 10,000 lbs. per square inch in spite of a low residual alcohol content.

Accordingly, it is desirable to maintain the shellac binder within these limits.

Since certain changes may be made in the above invention and different embodiments of the invention can be made without departing from the scope thereof, it is intended that all matter contained in the above description or taken in connection with the accompanying drawing shall be interpreted as illustrative and not in a limiting sense.

I claim as my invention:

1. The method of producing high compression strength laminated mica members which comprises applying an alcoholic solution of substantially iron-free shellac to mica flakes to produce sheets of from 0.005 to 0.020 inch in thickness, subjecting the unpressed sheets to vacua of 20 inches of mercury and higher and a temperature of from 20° C. to 80° C. for 4 to 20 hours, the time varying inversely with temperature, and laminating a predetermined number of sheets under pressure and temperature to produce the laminated member.

2. The method of producing high compression strength laminated mica members which comprises applying an alcoholic solution of substantially iron-free shellac to mica flakes to produce sheets of from 0.005 to 0.020 inch in thickness, subjecting the unpressed sheets to vacua of 20 inches of mercury and higher and a temperature of from 20° C. to 80° C. for 4 to 20 hours, the time varying inversely with temperature, to reduce the alcoholic content to 0.1% or less based on the weight of the shellac, and laminating a predetermined number of sheets under pressure and temperature to produce the laminated member.

3. The process of providing for a high compression strength laminated mica sheet which comprises subjecting mica flakes coated with an alcoholic solution of shellac to a vacuum of from 20 inches of mercury and higher and at a temperature of from 20° C. to 80° C. for 4 to 20 hours, the time varying inversely with temperature, to reduce the alcohol content of the shellac to 0.1% or less.

LAWRENCE R. HILL.